United States Patent Office 2,826,548
Patented Mar. 11, 1958

2,826,548

DRILLING FLUID

William A. Busch, Pevely, Mo., assignor to Monsanto Chemical Company, St. Louis, Mo., a corporation of Delaware No Drawing. Application June 18, 1956
Serial No. 591,817

14 Claims. (Cl. 252—8.5)

This invention relates to a drilling mud such as is employed in the rotary drilling of oil and gas wells. More particularly, it relates to a drilling mud which has improved properties for preventing or reducing loss of fluid from the well bore into the surrounding formations.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then upward through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drill hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump pressures and/or power consumption. The drilling mud must also be sufficiently thixotropic, or have sufficient gel strength, to prevent settling of solids from the mud when circulation is stopped, but, at the same time, must readily release the cuttings from suspension when the mud is agitated as in the settling pits.

Of prime importance is the so-called water-loss or wall-building characteristic of the mud. A good mud deposits a thin, tough impermeable filter cake which prevents much fluid from being lost to the formation by pressure filtration. When large amounts of water filter from the mud into the formation surrounding the borehole, the solid contents of the mud build up a thick filter cake on the walls of the hole. If this filter cake becomes thick enough, it may restrict the size of the annular passage, or slough off and cause jamming of the bit. In addition, other difficulties are caused by high water loss. Fluid lost to the formation may cause hydration of formation shales resulting in swelling or heaving of the formation. Water lost to the formation may also result in plugging or "water-blocking" of oil-bearing sands.

Considerable work has been done in an attempt to develop additive agents for drilling muds to impart these desirable properties of viscosity, gel strength, and filtration characteristics thereto. This is particularly true with regard to filtration rate or water loss. In order to prevent such loss, it has been the usual practice to add to the mud chemical agents such as sulfonated rubber, hydrolyzed polyacrylonitrile, polyalkyl aryl sulfonates, starch and starch derivatives, various celluloses, and the like. While these additives function effectively as water-loss reducers, it has been found that they themselves often impart other undesirable properties to the drilling muds in which they are incorporated. For example, some of the above-mentioned additives, such as hydrolyzed polyacrylonitrile, increase viscosity beyond the satisfactory limits and adversely affect gel strength. The starches are objectionable because they ferment, thus making them less desirable for this use.

It is, therefore, an object of the present invention to provide an aqueous dispersion or suspension of finely divided solid materials which has little tendency to lose water by filtration therefrom.

Another object of the invention is to provide an improved water-base drilling mud having a low filtration rate suitable for use in rotary drilling of boreholes into subsurface formations.

A still further object of the invention is to provide an agent which, on addition to a drilling mud, will substantially reduce the loss of water therefrom without adversely affecting either the viscosity of the mud or its ability to maintain solids in suspension.

It is still another object of the invention to provide an improved method of drilling oil or gas wells in which the water-base drilling mud herein described is employed.

An additional object is to provide a drilling mud which is immune to the deleterious thickening effect of salt.

Other objects and advantages will become apparent to those skilled in the art from the following description and appended claims.

These objects may be accomplished according to the present invention by incorporating in the water-base drilling mud a sufficient amount of a copolymer of isobutylene and maleic anhydride of relatively high molecular weight which contains mixed therewith a minor proportion of a higher glycol to reduce the tendency of said drilling mud to lose water by filtration. The composition of the present invention may be described briefly as a mixture comprising finely divided solid material, an aqueous vehicle in which the solid material is dispersed or suspended, and a sufficient amount of a copolymer of isobutylene and maleic anhydride of relatively high molecular weight which contains mixed therewith a minor proportion of a higher glycol to reduce the loss of water from the mixture by filtration. Copolymers of isobutylene and maleic anhydride have previously been proposed as water-loss reducers. However, it has now been discovered that the glycol-treated copolymers are distinctly superior to the untreated materials since more effective control of water loss is achieved by the use of significantly smaller quantities of the latter as an additive to a given quantity of mud.

The finely divided solid material of the invention may, of course, be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayed subsurface formations are drilled. Weighting materials added to increase specific gravity such as barytes, iron oxide, calcium carbonate, silica and the like may also be included.

The aqueous medium may be fresh water such as obtained from wells or streams; it may be salt water from the sea or from wells; or, it may even include oil-in-water emulsions, i. e., water which has become contaminated in some way with small quantities of oil, or to which such oil has been added to gain some desired advantage.

It is contemplated that the drilling muds of the invention may also contain other additives besides the glycol-treated copolymers of isobutylene and maleic anhydride. Materials such as caustic, quebracho, lime, cement, gypsum and the like may be added to the drilling mud at the surface or may be encountered in subsurface formations during drilling operations.

The additives for the practice of the invention are readily prepared by first copolymerizing maleic anhydride and isobutylene according to the manner of the prior art as descibed, for example, in U. S. Patents 2,055,456 and 2,378,629. Generally, the copolymers are prepared by reacting isobutylene with maleic anhydride in the presence of a peroxide catalyst in an aliphatic or aromatic hydrocarbon which is a solvent for the monomers but is a non-solvent for the heteropolymer formed. Suitable solvents include benzene, toluene, xylene or ethylene dichloride, while benzoyl peroxide, for example, may be used as a catalyst. The copolymer will contain substantially equimolecular quantities of the isobutylene residue and maleic anhydride residue.

The suspension of the polymeric material in the solvent is then treated by adding to it an amount of a higher glycol in the range of from about 1 to about 10 and preferably about 5 parts by weight for each 100 parts by weight of suspended solid. The solvent is separated from the suspension by evaporation, the material is dried and then ground to the finely divided state suitable for its use in the conventional manner. Glycols suitable for treatment of the copolymer are those having the following structure: HO—R—OH, wherein R is selected from the group consisting of alkylene and oxaalkylene radicals having molecular weights between 42 and 116 and wherein the hydroxyl groups are attached to separate cabon atoms. Such a structural formula includes glycols such as hexylene glycol, diethylene glycol, propylene glycol, dispropylene glycol, tetramethylene glycol, and triethylene glycol. The class of useful glycols is limited to those included within the scope of the above structural formula.

Particularly useful in the invention are the amide nitrogen-containing copolymers derived from the isobutylene-maleic anhydride copolymers such as the half-amide, half-ammonium salts, and other salts of the copolymers, especially the sodium and the potassium salts. The half-amide, half-ammonium salt may be prepared by contacting the particles of the solid heteropolymer with ammonia gas at ordinary or elevated temperatures as described, for example, in U. S. Patent 2,504,003. However, preferred procedure for the treatment with ammonia involves suspending the solid polymer in an inert organic liquid such as benzene and bubbling ammonia gas through the resulting slurry. The glycol treatment may then be effected by adding the desired glycol to the suspension of the polymer in the organic medium and evaporating the inert organic liquid used, or the glycol may be added to the solid polymer after the evaporation of the suspending medium. In either case, it is present admixed with the polymer during the screening operation by which it is rendered in the form in which it is to be used.

In order to be effective as water-loss reducers, the glycol-treated copolymers used in pacticing the invention should have a relatively high molecular weight. Generally speaking, the minimum range of molecular weight values should be on the order of from about 10,000 to about 40,000. It is preferred to use those copolymers having an average molecular weight in the range from about 50,000 to about 300,000. Copolymers having molecular weights in excess of 300,000 may also be employed and these frequently give increased wall-sealing efficiency. When these higher polymers are used, however, an increase in mud viscosity is an accompanying effect and compensation must be made therefor by the addition of viscosity controllers depending upon the character of the mud itself.

The quantities of the glycol-treated isobutylene-maleic anhydride copolymers to be employed in the drilling mud of the invention will vary with circumstances over a reasonably wide range and the amount employed in a specific suspension or dispersion will depend upon these circumstances and the characteristics of the material treated. Ordinarily, satisfactory results will be obtained with quantities ranging between 1 and 4 pounds per 42-gallon barrel of drilling mud. For optimum reduction in filtration rate with certain drilling muds, however, quantities up to 6 lb. per 42-gallon barrel may be required. On the other hand, in some cases where only small improvement in water loss is needed, as little as 0.5 pound per barrel of the additive will produce the desired filtration rate.

When employed in accordance with the invention, the glycol-treated copolymers may be added directly to the drilling mud as a dry powder, as a slurry suspended in a suitable liquid, or as a solution in water or some other suitable solvent, and they may be incorporated therein at any convenient point in the mud circulation system. It may be desirable to employ a mixing device, such as a cone and jet mixer or the equivalent, for incorporating the additive in the mud.

The following example is presented to particularly illustrate the invention but is not intended to limit the invention in any way except as it is limited in the appended claims. All parts given are by weight.

EXAMPLE I

About 1995 parts of benzene was charged to a jacketed polymerization reactor which had been thoroughly purged of air and was provided with an efficient stirrer. To this was added 200 parts of maleic anhydride and 2.5 parts of benzoyl peroxide and the resulting mixture was heated to a temperature of about 54° C. Isobutylene was then charged from a gas cylinder to the reactor with continuous stirring until a total of 125 parts had been added. The reaction was allowed to proceed with constant stirring for about 6 hours. The reactor temperature was maintained between 50 and 60° C. during the addition of the olefin and throughout the subsequent reaction period. Pressure build-up in the reactor did not exceed 6 p. s. i. g.

After the polymerization was complete, the reactor was vented to atmospheric pressure, the reaction mixture was cooled to approximately 30° C., and 71 parts of gaseous ammonia was bubbled through the slurry while the latter was continuously and thoroughly agitated for about 3.5 hours. The ammoniation reaction is exothermic and cooling water through the reactor jacket was employed to keep the temperature below 50° C. throughout the reaction period. The pressure in the reactor varied from atmospheric to a maximum of 16 p. s. i. g.

After the theoretical amount of ammonia was taken up by the isobutylene-maleic anhydride copolymer, the reaction slurry was transferred to a drier where the benzene was distilled off first at atmospheric pressure, then under full vacuum at a temperature of about 100° C. until the copolymer was thoroughly dry and free from all traces of the solvent. There was obtained 349 g. of copolymer as a very fine, white, free-flowing material with a molecular weight in excess of 10,000 containing about 1.4% ammonia, 0.6% maleic anhydride, 0.6% water, and a pH in aqueous solution of 7.5.

A second copolymer of isobutylene and maleic anhydride was made under essentially the same conditions of temperature, pressure, reactant ratios, etc., except that in this instance 5% by weight of the expected amount of polymer (approximately 17.5 parts) of hexylene glycol was added to the reaction mixture at the end of the ammoniation reaction just prior to the drying step and stirred into the slurry for approximately 15 minutes. The copolymer was then dried in the usual manner as described above.

A stock of drilling mud was prepared containing 35% solids suspended in salt water. On a dry basis, the solids consisted of 10 parts by weight of Tennessee ball clay, 4 parts by weight of Dixie bond clay and 1 part by weight of bentonite (Bariod's "Aquagel"). Varying amounts of the above isobutylene-maleic anhydride polymers, i. e., the untreated copolymer and that treated with hexylene glycol, were added to portions of this mud. The resulting samples were tested by means of the standard procedure given in "Recommended Practice for Standard Field Procedure for Testing Drilling Fluids" of the American Petroleum Institute, third edition, May 1950, to evaluate the relative effectiveness of the two copolymer additives as water-loss reducers. Results of these tests are presented in Table I. Viscosity and gel strength values were not significantly affected, both remaining within the acceptable range in all samples.

Table I

| Amount Added (lb./bbl.) | Filtration Rate (cc. in 30 min. API) | |
|---|---|---|
| | Untreated Copolymer | Glycol-Treated Copolymer |
| 0 | 45.3 | 49 |
| 0.5 | 42 | 17 |
| 1.0 | 27.5 | 8.8 |
| 2.0 | 7 | 5.0 |
| 4.0 | 4.5 | 3.5 |

It will be seen from these data that the isobutylene-maleic anhydride copolymer which contains a small amount of admixed hexylene glycol is about three times as effective in the lower concentration ranges than the untreated material. Only half as much of the glycol-treated additive is required to obtain the same level of effectiveness that is achieved with the untreated copolymer.

Drilling muds containing the glycol-modified copolymers of isobutylene and maleic anhydride of this invention are particularly valuable in that they promote the formation of a thin filter cake on the walls of the borehole, said filter cake being substantially impervious to water and naturally-occurring liquids, with the result that the well does not become contaminated by the naturally-occurring liquids, and the porous formations through which the drill passes do not absorb water from the mud. This latter condition is an aid in maintaining the quality of the mud, preventing swelling and heaving of the earth formation, etc. The glycol-modified isobutylene-maleic anhydride copolymers of the invention are resistant to bacterial decomposition, do not materially affect the viscosity of the drilling muds when used in quantities which are efficient in building up the filter cake, and have excellent thermal stability.

This application is a continuation-in-part of my co-pending application, Serial No. 463,797, filed October 21, 1954, now abandoned.

What is claimed is:

1. A water-base drilling mud which comprises a major amount of an aqueous suspension of finely divided solid inorganic materials and a copolymer of isobutylene and maleic anhydride having a molecular weight in excess of 10,000 and containing admixed therewith from about 1% to about 10% by weight of a glycol having the formula,

HO—R—OH wherein R is selected from the group consisting of alkylene and oxa-alkylene radicals having molecular weights between 42 and 116 and wherein the hydroxyl groups are attached to separate carbon atoms, in an amount sufficient to reduce the water loss due to filtration without increasing the viscosity of said drilling mud to such an extent that it cannot be circulated.

2. A water-base drilling mud as in claim 1 wherein the copolymer of isobutylene and maleic anhydride is present in the form of its half-amide, half-ammonium salt.

3. A water-base drilling mud as in claim 1 wherein the copolymer of isobutylene and maleic anhydride is present in the form of its disodium salt.

4. A water-base drilling mud which comprises a major amount of an aqueous suspension of finely divided solid inorganic materials and a minor amount of a copolymer of isobutylene and maleic anhydride having a molecular weight in excess of 10,000 and containing admixed therewith from about 1% to about 10% by weight of a glycol having the formula

HO—R—OH wherein R is selected from the group consisting of alkylene and oxa-alkylene radicals having molecular weights between 42 and 116 and wherein the hydroxyl groups are attached to separate carbon atoms, said minor amount of said copolymer being in the range from about 0.5 pound to 6 pounds per 42-gallon barrel of said mud.

5. A water-base drilling mud as in claim 4 wherein the copolymer of isobutylene and maleic anhydride is present in the form of its half-amide, half ammonium salt.

6. A water-base drilling mud as in claim 4 wherein the copolymer of isobutylene and maleic anhydride is present in the form of its disodium salt.

7. A water-base drilling mud which comprises a major amount of an aqueous suspension of finely divided solid inorganic materials and a minor amount of a copolymer of isobutylene and maleic anhydride having a molecular weight in excess of 10,000, said copolymer being in the form of its half-amide, half-ammonium salt and containing admixed therewith about 5% by weight of hexylene glycol, said minor amount of copolymer being in the range from 0.5 pound to 6 pounds per 42-gallon barrel of said mud.

8. A water-base drilling mud as in claim 7 wherein the copolymer is present in the form of its disodium salt.

9. In a process for drilling a well wherein there is circulated in the well an aqueous-clay base drilling mud, the method of forming a filter cake on the wall of said well to decrease the loss of fluid from said drilling mud contained therein into surrounding earthen formations which comprises incorporating in said drilling mud a copolymer of isobutylene and maleic anhydride having a molecular weight in excess of 10,000 and having admixed therewith from about 1% to about 10% by weight of a glycol having a formula

HO—R—OH wherein R is selected from the group consisting of alkylene and oxa-alkylene radicals having molecular weights between 42 and 116 and wherein the hydroxyl groups are attached to separate carbon atoms, in an amount sufficient to reduce the fluid loss due to filtration through said filter cake without increasing the viscosity of said mud to such an extent that it cannot be circulated, and contacting the wall of said well with the resulting drilling mud to form said filter cake thereon.

10. The process of claim 9 in which the copolymer of isobutylene and maleic anhydride is present in the form of its half-amide, half-ammonium salt.

11. The process of claim 9 in which the copolymer of isobutylene and maleic anhydride is present in the form of its disodium salt.

12. In a process for drilling a well wherein there is circulated in the well an aqueous clay-base drilling mud, the method of forming a filter cake on the wall of said well to decrease the loss of fluid from said drilling mud contained therein into surrounding earthen formations which comprises incorporating in said drilling mud a copolymer of isobutylene and maleic anhydride having a molecular weight in excess of 10,000 and having admixed therewith from about 1% to about 10% by weight of hexylene glycol, in an amount sufficient to reduce the fluid loss due to filtration through said filter cake without increasing the viscosity of said mud to such an extent that it cannot be circulated, and contacting the wall of said well with the resulting drilling mud to form said filter cake thereon.

13. The process of claim 12 in which the copolymer of isobutylene and maleic anhydride is present in the form of its half-amide, half-ammonium salt.

14. The process of claim 12 in which the copolymer of isobutylene and maleic anhydride is present in the form of its disodium salt.

References Cited in the file of this patent

UNITED STATES PATENTS

| | | |
|---|---|---|
| 2,552,775 | Fisher et al. | May 15, 1951 |
| 2,589,949 | Meadors | Mar. 18, 1952 |
| 2,718,497 | Oldham et al. | Sept. 20, 1955 |
| 2,751,368 | Yost et al. | June 19, 1956 |